US012791456B2

(12) United States Patent
Beesley et al.

(10) Patent No.: US 12,791,456 B2
(45) Date of Patent: Nov. 10, 2026

(54) SYSTEMS AND METHODS FOR MONITORING CONCENTRATION OF A COMPONENT OF A SAMPLE FLUID

(71) Applicant: Thermo Environmental Instruments LLC, Franklin, MA (US)

(72) Inventors: Angela Beesley, St. Helens (GB); Martin Smith, Macclesfield (GB); Anthony Curtis, Alresford (GB); Phoebe Dunn, Wilmslow (GB)

(73) Assignee: THERMO ENVIRONMENTAL INSTRUMENTS LLC, Franklin, MA (US)

( * ) Notice: Subject to any disclaimer, the term of this patent is extended or adjusted under 35 U.S.C. 154(b) by 340 days.

(21) Appl. No.: 18/499,777

(22) Filed: Nov. 1, 2023

(65) Prior Publication Data

US 2024/0142357 A1 May 2, 2024

Related U.S. Application Data

(60) Provisional application No. 63/381,982, filed on Nov. 2, 2022.

(51) Int. Cl.
*G01N 11/04* (2006.01)

(52) U.S. Cl.
CPC .................................... *G01N 11/04* (2013.01)

(58) Field of Classification Search
CPC ............... G01N 11/04; G01N 33/0018; G01N 33/0011; G01N 33/0026; G01N 33/0004; G01N 1/38
See application file for complete search history.

(56) References Cited

U.S. PATENT DOCUMENTS 4,705,669 A 11/1987 Tsuji et al.
6,211,956 B1 * 4/2001 Nicoli .................... G01N 15/02 356/337
7,025,870 B2 * 4/2006 Makihara ........... G01N 33/0018 205/785.5
11,099,115 B2 * 8/2021 Pejcinovic ........... G01N 15/088
(Continued)

FOREIGN PATENT DOCUMENTS

EP 2613140 A1 7/2013
JP 3853978 B2 12/2006
KR 102401935 B1 5/2022

OTHER PUBLICATIONS

Tomczyk, Krzysztof, Małgorzata Kowalczyk, and Ksenia Ostrowska. "Procedure Proposal for Minimising the Dynamic Error of Second-Order Sensors." Sensors 22.5 (2022): 1901 (Year: 2022).*
(Continued)

*Primary Examiner* — Fatemeh Esfandiari Nia

(57) ABSTRACT

A system for analyzing the concentration of a first component in a sample fluid is described. The system provides a mixture of sample fluid and control fluid to a fluid concentration measuring apparatus in a controlled ratio. The system stores flow change model, representing the variation in time of the flow of the sample fluid through the system between a valving and the fluid concentration measuring apparatus in response to a variation of the controlled rate by the valving. The system estimates the concentration of the first component in the sample fluid based at least in part on the controlled ratio, and the flow change model.

24 Claims, 9 Drawing Sheets

(56) References Cited

U.S. PATENT DOCUMENTS

| | | | | |
|---|---|---|---|---|
| 2003/0000281 | A1* | 1/2003 | Ketler ................ | G01N 33/0006<br>73/1.06 |
| 2022/0170900 | A1 | 6/2022 | Choi et al. | |

OTHER PUBLICATIONS

Buckles, R. A., et al. "Superlinearity, saturation, and the PMT—Tailoring and calibration methodology for prompt radiation detectors." Review of Scientific Instruments 89.10 (2018). (Year: 2018).*

Giechaskiel B., et al., "Calibration and Modelling of Ejector Dilutors for Automotive Exhaust Sampling," Measurement Science and Technology, Sep. 30, 2004, vol. 15, No. 11, XP020066404, pp. 2199-2206.

PCT/US2023/078363, International Search Report and Written Opinion, Mar. 6, 2024, 14 pages.

* cited by examiner

FIG. 6B
Raw PMT (mV)
Total Sulphur (ppm)
TOTAL SULPHUR (ppm)
RAW PMT (mV)
601
602

SYSTEMS AND METHODS FOR MONITORING CONCENTRATION OF A COMPONENT OF A SAMPLE FLUID

FIELD OF THE INVENTION

The invention relates to systems and methods for monitoring concentration of a component of a sample fluid. The invention is particularly useful for improving the accuracy of dual-range analysers in response to rapid changes in the monitored concentrations.

BACKGROUND OF THE INVENTION

It is known to provide systems and methods for monitoring concentration of a component of a sample fluid. So-called dual-range analyzers may be used to provide a larger range over which concentrations can be accurately measured. Such analyzers provide a sample fluid to be measured to fluid concentration measuring apparatus at one of two controlled rates. The sample fluid is mixed with a carrier fluid. The mixture of the carrier fluid and sample fluid is then measured by the fluid concentration measuring apparatus. The rates may be selected so that at high concentrations, the sample fluid is provided at a lower rate, while at low concentrations, the sample fluid is provided at a higher rate. The fluid concentration measuring apparatus takes into consideration the rate at which the sample fluid is being supplied when estimating its concentration.

The inventors have realized that such dual-range analyzers can provide anomalous results when the concentration being monitored varies both rapidly and by a large amount. This is because immediately after switching from providing sample fluid at a high rate to providing sample fluid at a low rate, there remains a residue of the high-rate sample fluid in the system, while a low rate is assumed. Since the fluid concentration measuring apparatus does not take account for the residue of the sample fluid provided at high rate and assumes all sample fluid was provided at a low rate, the measured concentration provides an over-estimate in relation to the residue.

The invention aims to lessen or avoid this problem.

SUMMARY

Systems, methods, and products to address these and other needs are described herein with respect to illustrative, non-limiting, implementations. Various alternatives, modifications and equivalents are possible.

According to the invention, there is provided in a first aspect a system for analyzing the concentration of a first component in a sample fluid, comprising: a sample inlet for receiving a sample fluid to be analyzed comprising at least a first component; fluid concentration measuring apparatus for measuring the concentration of the first component within a fluid; a control inlet for receiving a control fluid; and valving in communication with the sample inlet and arranged to supply the sample fluid to the fluid concentration measuring apparatus at a controlled rate, wherein: the system provides a mixture of sample fluid and control fluid to the fluid concentration measuring apparatus in a controlled ratio; the system stores a flow change model, representing the variation in time of the flow of sample fluid through the system between the valving and the fluid concentration measuring apparatus in response to a variation of the controlled rate by the valving; and the system estimates the concentration of the first component in the sample fluid based at least in part on the controlled ratio, and the flow change model.

According to the invention, there is provided in a second aspect a method for analyzing the concentration of a first component in a sample fluid, comprising: receiving a sample fluid to be analyzed comprising at least a first component; receiving a control fluid; mixing the sample fluid and the control fluid in a controlled ratio determined by valving to produce a mixed flow and thereby supplying the sample fluid to a fluid concentration measuring apparatus at a controlled rate; measuring the concentration of the first component within the mixture using the fluid concentration measuring apparatus; and estimating the concentration of the first component in the sample fluid using the controlled ratio and a flow change model, wherein the flow change model represents the variation in time of the flow of sample fluid through the system between the valving and the fluid concentration measuring apparatus in response to a variation of the controlled rate by the valving.

According to the invention, there is provided in a third aspect a method for deriving a flow change model in a system for analyzing the concentration of a first component in a sample fluid, comprising: providing a sample fluid comprising at least a first component and having a fixed concentration of the first component; receiving a control fluid; mixing the sample fluid and the control fluid in a first ratio determined by valving to produce a first mixed flow; measuring the concentration of the first component in the first mixed fled flow using the fluid concentration measuring apparatus; estimating the concentration of the first component in the sample fluid using the first ratio, actuating the valving to mix the sample fluid and the control fluid in a second ratio, different from the first ratio, to produce a second mixed flow; measuring the concentration of the first component in the second mixed fled flow using the fluid concentration measuring apparatus; estimating the concentration of the first component in the sample fluid using the second ratio; capturing the time series of estimates of concentration; and deriving a flow change model from the time series.

Embodiments of the invention can provide a more accurate estimate of a concentration of a first component in a sample fluid. In particular, preferred embodiments can avoid large overshoots when tracking the concentration of a first component in a sample fluid in response to sudden variations.

BRIEF DESCRIPTION OF THE DRAWINGS

For a better understanding of the invention, and to show how the same may be put into effect, reference will now be made, by way of example only, to the accompanying drawings in which.

Figure 1:
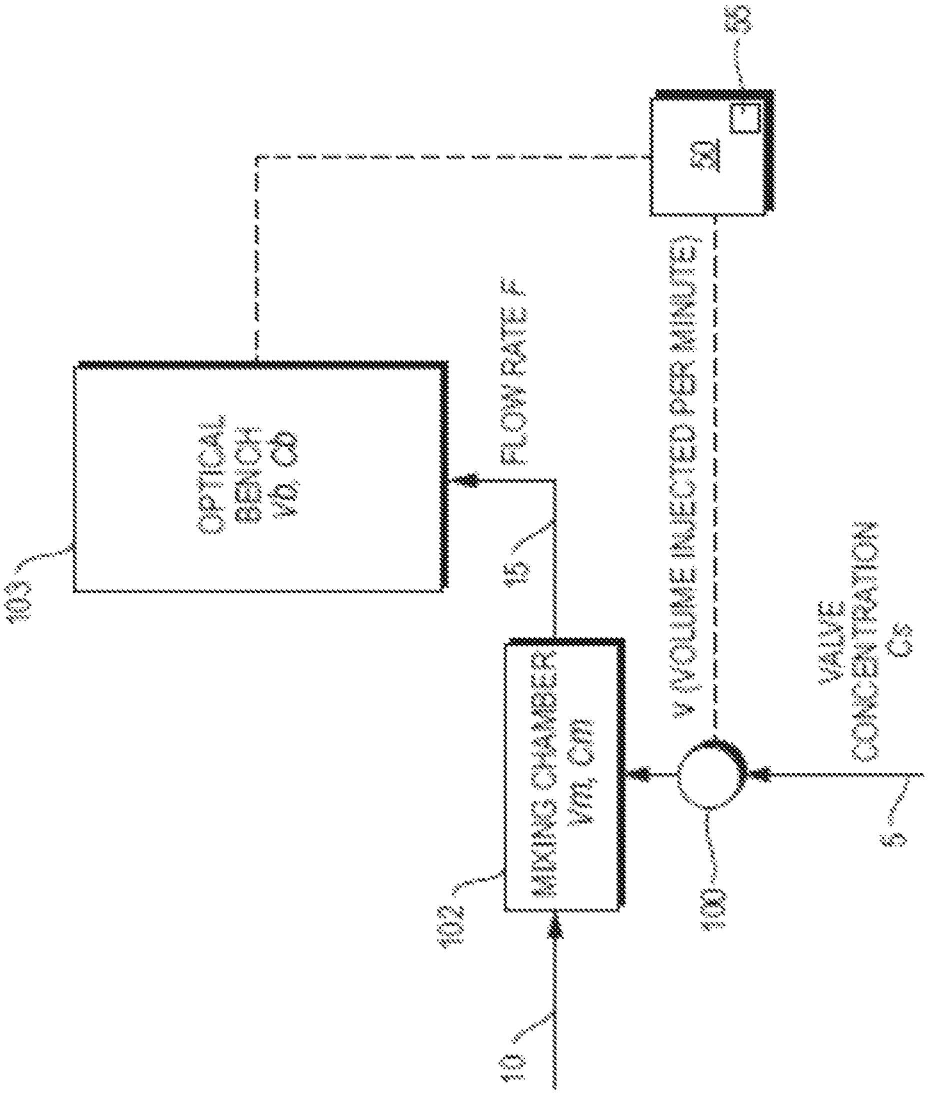
FIG. 1 is a schematic representation of a system for analyzing the concentration of a first component in a sample fluid.

The figures referred to above are not drawn necessarily to scale, should be understood to provide a representation of particular embodiments, and are merely conceptual in nature and illustrative of the principals involved. The same reference numbers are used in the drawings for similar or identical components and features shown in various alternative embodiments.

DETAILED DESCRIPTION

In the description of the invention herein, it is understood that a word appearing in the singular encompasses its plural counterpart, and a word appearing in the plural encompasses its singular counterpart, unless implicitly or explicitly understood or stated otherwise. Furthermore, it is understood that for any given component or embodiment described herein, any of the possible candidates or alternatives listed for that component may generally be used individually or in combination with one another, unless implicitly or explicitly understood or stated otherwise. Moreover, it is to be appreciated that the figures, as shown herein, are not necessarily drawn to scale, wherein some of the elements may be drawn merely for clarity of the invention. Also, reference numerals may be repeated among the various figures to show corresponding or analogous elements. Additionally, it will be understood that any list of such candidates or alternatives is merely illustrative, not limiting, unless implicitly or explicitly understood or stated otherwise. In addition, unless otherwise indicated, numbers expressing quantities of ingredients, constituents, reaction conditions and so forth used in the specification and claims are to be understood as being modified by the term "about."

Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical values, however, inherently contain certain errors necessarily resulting from the standard deviation found in their respective testing measurements.

As can be seen in FIG. 1, a system for analyzing the concentration of a first component in a sample fluid comprises: a sample inlet 5; a control inlet 10; and fluid concentration measuring apparatus 103.

The sample inlet 5 is arranged to receive a sample fluid to be analyzed.

The sample fluid to be analyzed comprises at least first and second components. The concentration of the first component is to be measured.

The control inlet is arranged to receive a control fluid. The control fluid may be air, or any gas having a composition that does not include the first component or includes a known amount of the first component. Suitable control fluids are Nitrogen, Helium, Argon, and air substantially devoid of the first component.

The fluid concentration measuring apparatus 103 has a measuring inlet 15 which is arranged to receive a mixture of the sample fluid received through the sample inlet 5 and the control fluid received through the control inlet 10.

The fluid concentration measuring apparatus 103 is arranged to measure the concentration of the first component within the mixture.

The fluid concentration measuring apparatus 103 may have a controllable sensitivity.

For example, the fluid concentration measuring apparatus may include an electrical sensor and the controllable sensitivity may be the gain of the sensor.

Most preferably, the fluid concentration measuring apparatus 103 includes a photomultiplier tube.

In preferred embodiments, a mixing chamber 102 is provided for mixing the sample fluid and control fluid to provide a mixture to the measuring inlet 15. In other embodiments, the sample fluid may simply be delivered directly into a flow of control fluid along a conduit, without a chamber to increase mixing.

The valving 100 is in communication with the sample inlet 5 and arranged to supply the sample fluid to the fluid concentration measuring apparatus 103 at a controlled rate. In some embodiments, the controlled rate is one of a low flow rate and a high flow rate. The sample fluid is supplied to the fluid concentration measuring apparatus 103 as part of a mixture. The mixture includes the sample fluid and the control fluid. The mixture is preferably provided to the fluid concentration measuring apparatus 103 at a constant rate. The rate at which the sample fluid is provided determines its concentration in the mixture.

That is, the valving 100 provides a mixture of sample fluid and control fluid to the fluid concentration measuring apparatus 103 in a controlled ratio. The system estimates the concentration of the first component in the sample fluid based at least in part on the controlled ratio, such that when the ratio changes, the measured estimate is adapted based on the controlled ratio.

Figure 3A:
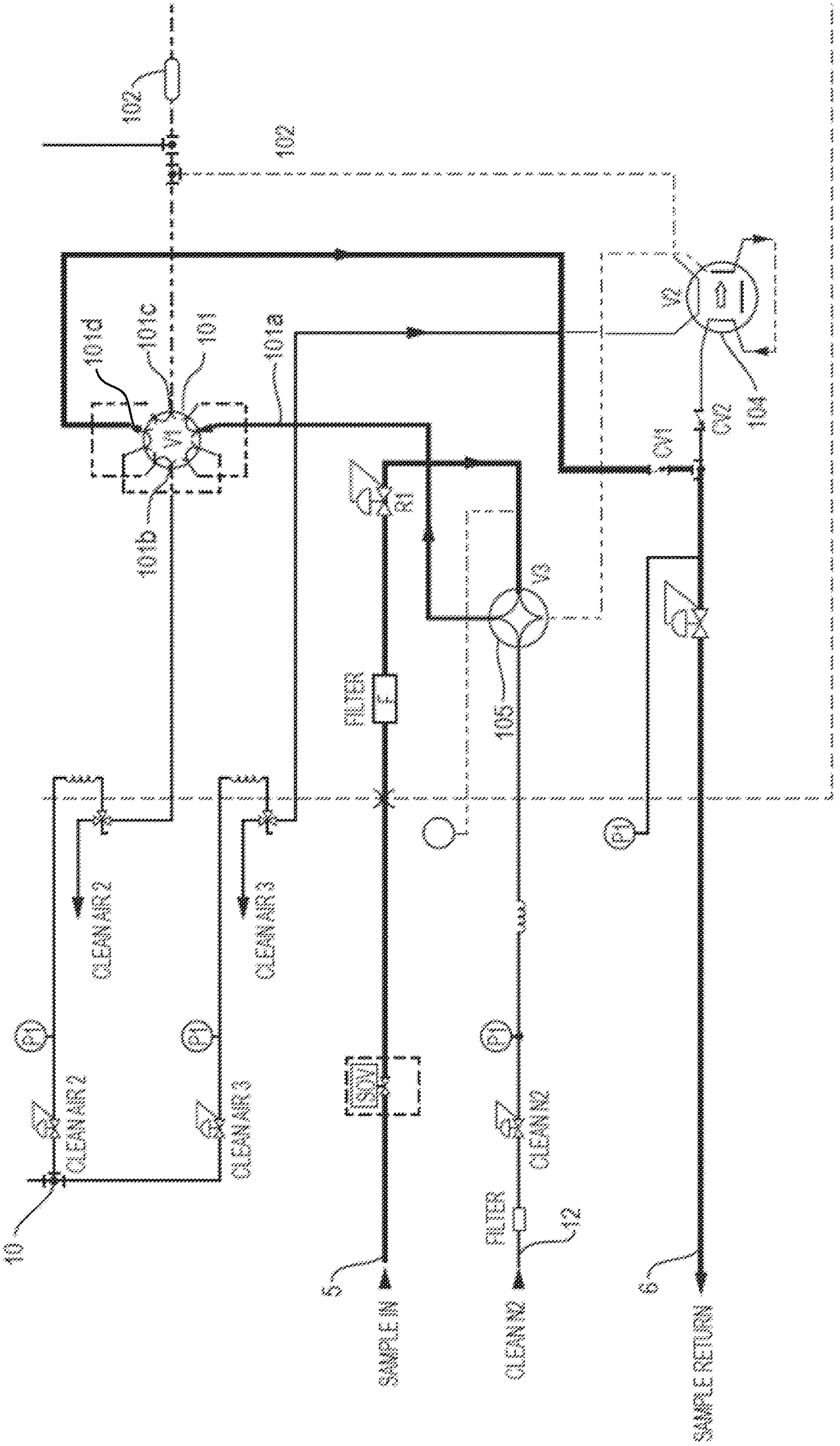
FIGS. 3A and 3B show a system of valves for providing fluid to a fluid monitoring apparatus.
Figure 3B:
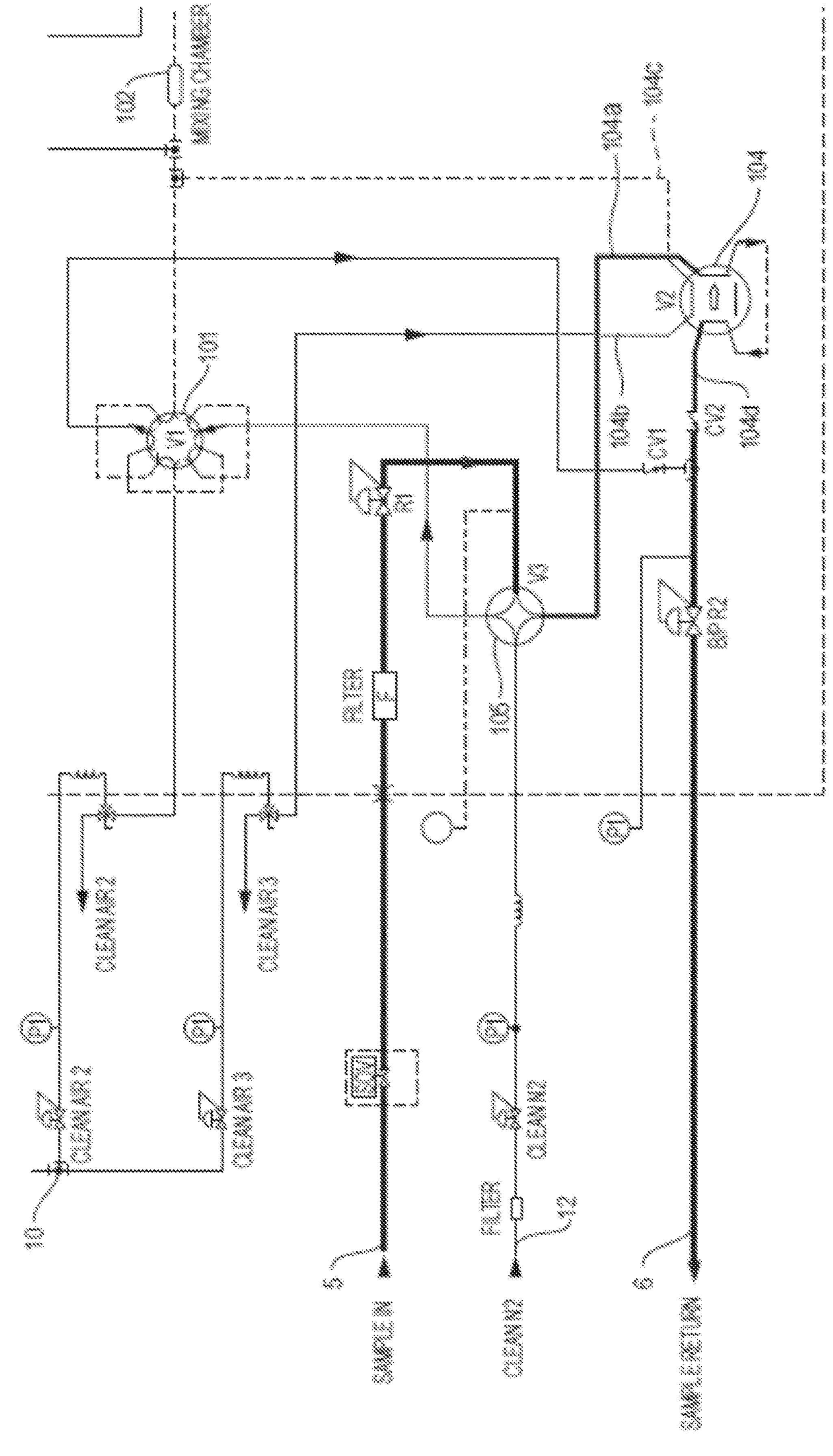

FIGS. 3A and 3B show an optional system that could be used as valving 100.

In FIG. 3A, there can be seen a first flow path from sample inlet 5 via a path switching valve 105 to a first injection valve 101 and on to an outlet 6.

In FIG. 3B, there can be seen a second flow path from sample inlet 5 via a path switching valve 105 to a second injection valve 104 and on to an outlet 6.

Valving 100 in this example includes the first injection valve 101, the second injection valve 104, and the path switching valve 105.

The path switching valve 105 switches between two states to supply sample fluid to either the first injection valve 101 or the second injection valve 104. In this way, path switching valve 105 determines which flow path is selected. The path switching valve 105 is controlled by controller 50.

The first injection valve 101 comprises two inlets 101*a*, 101*b*, and two outlets 101*c*, 101*d*. Control fluid is connected to inlet 101*a* and sample fluid is connected to inlet 101*b*. The first injection valve 101 has two configurations. Except for momentary switching between the 2 valve configurations, inlet 101*b* connects to outlet 101*c* via one or other of 2 external sample loops and inlet 101*a* connects to outlet 101*d* via the other external sample loop. When the valve switches to its alternate configuration, the contents of the corresponding sample loop are flushed with control fluid from 101*b* to outlet 101*c*, while sample fluid from the switching valve 105 flows from 101*a* to 101*d* filling the second sample loop. When the valve switches back, control fluid sweeps the contents of the second sample loop to 101*c*. Outlet 101*c* connects to the mixing chamber 102.

The second injection valve 104 comprises two inlets 104*a*, 104*b*, and two outlets 104*c*, 104*d*. Control fluid is connected to inlet 104*a* and sample fluid is connected to inlet 104*b*. The second injection valve 104 has two configurations. Except for momentary switching between valve configurations, inlet 104*a* connects to outlet 104*d* via one or other of 2 internal sample loops and inlet 104*b* connects to outlet 104*c* via the other internal sample loop. When the valve switches to its alternate configuration, the contents of the corresponding sample loop are flushed with control fluid from 104*b* to outlet 104*c* while sample fluid from the switching valve 105 flows from 104*a* to 104*d* filling the second sample loop. When the valve switches back, control fluid sweeps the contents of the second sample loop to 104*c*. Outlet 104*c* connects to the mixing chamber 102.

The path switching valve 105 receives sample fluid from sample inlet 5. The path switching valve 105 supplies one of the first inlets 101*a*, 104*a* with sample fluid at any one time.

The control fluid inlet 10 supplies the second inlets 101*a*, 104*a* with control fluid.

The first injection valve 101 is arranged to inject sample fluid into a stream of control fluid along the first flow path to the fluid concentration measuring apparatus 103. Each cycle provides a first volume of sample fluid within a first injection cycle time.

The second injection valve 104 is arranged to inject sample fluid into a stream of control fluid along the second path to the fluid concentration measuring apparatus 103. Each cycle provides a second volume of sample fluid within a second injection cycle time.

The cycle time and sample loop volumes of the injection valve control the ratio of control fluid from control inlet 10 and sample fluid from sample inlet 5 provided to the fluid concentration measurement apparatus 103.

The first injection valve 101 supplies a mixture of fluid to the fluid concentration measurement apparatus 103 with a greater proportion of sample fluid than the second injection valve 104. Thus, the first injection valve 101 supplies sample fluid to the fluid concentration measurement apparatus 103 at a greater rate than the second injection valve 104.

A cleaning fluid supply inlet 12 is provided for flushing a cleaning fluid along either flow path when not used for supplying sample fluid. Cleaning fluid supply inlet 12 may be connected to a supply of nitrogen in some embodiments. That is, the path switching valve 105 receives cleaning fluid from cleaning fluid supply inlet 12. The path switching valve 105 supplies one of the first inlets 101*a*, 104*a* with sample fluid and simultaneously supplies the other of the first inlets 101*a*, 104*a* with cleaning fluid.

A controller 50 is provided, for example, as part of the fluid concentration measuring apparatus 103. The controller 50 is in communication with valving 100 and can process the concentration measurement made by the fluid measuring apparatus 103.

The fluid concentration measuring apparatus 103 provides a signal to the controller 50 to indicate the measured concentration of the first component in the mixture received at the measuring inlet 15.

The controller 50 controls the valving 100 based on the signal from the fluid concentration measuring apparatus 103.

Typically, a fluid concentration measuring apparatus 103 will be configured to monitor within a pre-defined range of concentrations. When the concentration being monitored leaves the range, accuracy can be reduced. Accordingly, some systems are provided with an "auto-range" function, whereby the controlled rate can be modified when the monitored concentration leaves the pre-defined range.

For example, there may be defined a concentration threshold. The controller 50 is configured to detect when the threshold has been exceeded and so instruct valving 100 to provide the sample fluid at a lower rate. Conversely, the controller 50 is configured to detect when the concentration drops below a threshold and so instruct valving 100 to provide the sample fluid at a higher rate. Optionally, one threshold may be used for triggering either switching event, or some form of hysteresis can be achieved by using two thresholds to prevent inadvertent frequent switching, as would be understood in the art. The controller 50 can correct for the provision of the sample fluid at a different rate, for example by modifying the sensitivity of the fluid concentration measuring apparatus 103. In this way, the concentration being measured can be kept within the accurate region of the operating range of the fluid concentration measuring apparatus 103.

The controller 50 is also configured to store a flow change model 55. The controller 50 is in communication with valving 100 and can process the concentration measurement made by the fluid measuring apparatus 103 to thereby estimate the concentration of the first component in the sample fluid based at least in part on the controlled ratio, and the flow change model 55.

The flow change model 55 is a mathematical or computational model of flow through at least part of the system. In particular, the flow change model 55 represents the variation in time of the flow of sample fluid through the system between the valving 100 and the fluid concentration measuring apparatus 103. The flow change model 55 can thereby represent the flow of sample fluid through the system between the valving 100 and the fluid concentration measuring apparatus 103 in response to a variation of the controlled rate by the valving.

The portion of the system modelled by the flow change model 55 is dependent upon the structure of the system as a whole.

For examples, in some embodiments having the optional mixing chamber 102, it may be sufficient (for the purpose of providing an accurate estimate of the measurement of concentration of the first component within the mixture) that the flow change model 55 represents the flow between the inlets of the mixing chamber 102 and the measuring inlet 15.

In other examples, the flow change model 55 may represent the flow all the way from the sample and control inlets 5, 10 to the outlet of the fluid concentration measuring apparatus 103.

In any case, the flow change model 55 may characterize the time variation of the flow for the period immediately following the modification by the valving 100 of flow to the fluid concentration measuring apparatus 103.

As an illustrative hypothetical example, there may be a case in which the concentration of a first component in a sample fluid increase steadily from a first value to a second value.

At time T0, the valving 100 provides the sample fluid at a first rate.

The fluid concentration measuring apparatus 103 measures the concentration of the first component.

As the concentration increases, eventually, the measured concentration will exceed a threshold.

The controller 50 detects that the threshold has been crossed and so, at time T1, switches the valving 100 to provide the sample fluid at a second rate, which is lower than the first rate.

At time T1, the volume of fluid between the valving and the fluid concentration measuring apparatus 103 passed the valving 100 before the switching, and so represents a residual volume of sample fluid provided at the first rate.

A period later, at time T2, the residual volume has (substantially, but for trace amounts) entirely passed the fluid concentration measuring apparatus 103.

After time T2, the volume of fluid between the valving and the fluid concentration measuring apparatus 103 passed the valving 100 after the switching, and so represents a volume of sample fluid provided at the second rate.

Before time T1, the controller 50 processes the measurements from the fluid concentration measuring apparatus 103 to provide an estimate of concentration of the first component based on the first rate.

After time T1, the controller 50 processes the measurements from the fluid concentration measuring apparatus 103 to provide an estimate of concentration of the first component based on the second rate.

From the above, it can be seen that the use of the second rate, which is used in the estimate of the concentration of the first component is most accurate after time T2. However, for the period between T1 and T2 the second rate is used in the processing of measurements of the residual volume, which was in fact provided at the first rate. Moreover, the residual volume is driven through the system under the pressure of the flow of sample fluid at the second rate, and some mixing between these fluids is also possible.

By using the second (lower) rate in the estimate of concentration of the residual volume provided at the first (higher) rate, the controller 50 typically will provide an over-estimate of the actual concentration of the first component.

Knowledge of how fluid flows from the valve 100 to the fluid concentration measuring apparatus 103 through the system can therefore be used to correct the estimate of the concentration of the first component.

For example, it is possible to model the time series of concentration measurements that would be expected for a sample fluid having a constant concentration of the first component, following a step change (e.g., decrease) in the provision of sample fluid from the first rate to the second rate.

A parametric model can be calibrated based on actual measurements through a system to provide a flow change model 55. That can then be used to correct the estimates (either continually, or specifically in any T1 to T2 period).

In particular, the inventors have identified that an over-damped harmonic model provides a good estimate of the behavior of most systems that can be calibrated based on a few measurements to provide a suitable flow change model 55.

One preferred way a flow change model 55 can be used is to provide a time-dependent attenuation of the sensitivity of the fluid concentration measuring apparatus 103. An alternative approach is simply to use the flow change model 55 to modify the estimated concentration values.

For the purpose of understanding the invention, the following is a purely exemplary explanation of one way a flow change model 55 can be defined. In this case, the system of FIG. 1 is modelled. In the example, the fluid concentration measuring apparatus 103 is a photomultiplier tube having the normalized gain vs. multiplier voltage behavior shown in FIG. 2.

Referring to FIG. 1, at any given point in time, from simple fluid dynamic principles the change in number of moles in the mixing chamber is:

$$\frac{dn_m}{dt} = vC_s - FC_m \qquad \text{(Equation 1)}$$

where $n_m$: number of moles in the mixing chamber v: volume of the sample fluid injected per minute F: sample Flow rate out of the mixing chamber 102

$C_m$: concentration in the mixing chamber $C_s$: concentration of the first component within the sample fluid at the valve Dividing Equation 1 by the volume in the mixing chamber, $V_m$, at any given time gives:

$$\frac{\frac{dn_m}{dt}}{V_m} = \frac{dC_m}{dt} = \frac{vC_s}{V_m} - \frac{FC_m}{V_m} \qquad \text{(Equation 2)}$$

Re-arranging Equation 2 gives:

$$\frac{dC_m}{dt} + \frac{FC_m}{V_m} = \frac{vC_s}{V_m} \qquad \text{(Equation 3)}$$

Similarly, the change in number of moles in the fluid concentration measuring apparatus 103 at any given point in time is:

$$\frac{dn_b}{dt} = FC_m - FC_b \qquad \text{(Equation 4)}$$

where $n_b$: number of moles in the fluid concentration measuring apparatus 103

$C_b$: concentration in the fluid concentration measuring apparatus 103

Dividing Equation 4 by the volume in the fluid concentration measuring apparatus 103, $V_b$, at any given time gives:

$$\frac{dC_b}{dt} + \frac{FC_b}{V_b} = \frac{FC_m}{V_b} \qquad \text{(Equation 5)}$$

Solutions of differential equations (3) and (5) results in the concentration measured at the fluid concentration measuring apparatus 103 at any given time as:

$$C_b - \frac{vC_s}{F} = \frac{\left(C_{m0} - \frac{vC_S}{F}\right)}{\left(1 - \frac{V_b}{V_m}\right)}\left(e^{\frac{-Ft}{V_m}} - e^{\frac{-Ft}{V_b}}\right) + \left(C_{b0} - \frac{vC_s}{F}\right)e^{\frac{-Ft}{V_b}} \qquad \text{(Equation 6)}$$

where $C_{m0}$: Initial mixing chamber concentration $C_{b0}$: Initial fluid concentration measuring apparatus 103 concentration $vC_S/F$: Steady state concentration Referring to Equation 6, the concentration measured at the fluid concentration measuring apparatus 103 at any given time is of the form:

$$x(t) = Ae^{r_1 t} + Be^{r_2 t} \qquad \text{(Equation 7)}$$

Equation 7 corresponds to the solution of a dynamic system acting as an unforced overdamped harmonic oscillator which in Laplace terms has a characteristic equation:

$$ms^2+bs+k=0 \quad \text{(Equation 8)}$$

where s is the Laplace operator, m and b are coefficients associated to the level of overdamping and friction of the oscillator.

This means that upon a step input such as a sudden change of range, the concentration (and therefore the voltage measured by a photomultiplier tube 103, in this example) as a function of time follows a system dynamic as per the following transfer function:

$$\frac{\text{Out}}{\text{In}} = \frac{1}{Ms^2 + Ns + 1} \quad \text{(Equation 9)}$$

Experiments may be carried out to determine the values of parameters M and N and find the multiplier voltage to achieve the required detector gain i.e., the attenuation voltage.

Whilst a Laplace analysis has been given above, as will be understood by the skilled reader, other mathematical analysis may be used, such as Z-transforms to take into consideration sampling times.

In an example system, the following experimental procedure may be carried out.

A sample fluid having a constant concentration of the first component supply is provided. Then the system is forced to switch the ranges (switch valve 100) from the first rate to the second rate (i.e., simulating the change that would occur in response to a sudden increase in concentration, but without modifying the concentration).

Figure 4A:
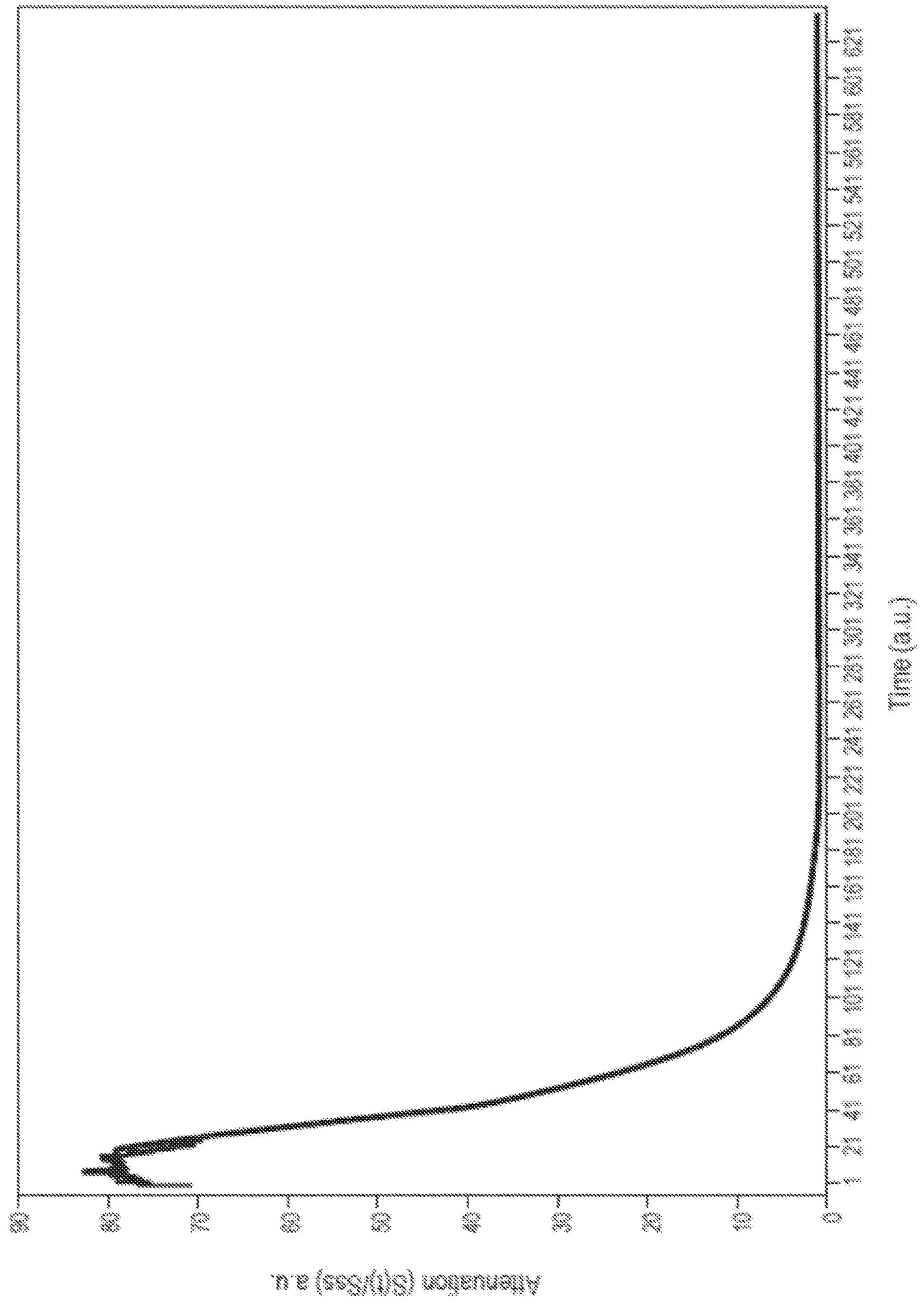
FIGS. 4A and 4B show example data.

As shown in FIG. 4A, which depicts actual measurements from a real machine, the output of the sensor in the fluid concentration measuring apparatus 103 (in this case, a photomultiplier tube) is not a step change, but a decline that begins rapidly and gradually reduces in rate. Here, the Y-axis represents voltage output (representative of concentration) divided by steady-state voltage output, and the X-axis represents time.

The values of parameters M and N of the flow change model 55 may be estimated by fitting the flow change model 55 (for example, that derived above in Equation 9) to the measured data. The fitted model is superimposed on the measurements in FIG. 4A.

Using the flow change model 55, it is therefore possible to identify an appropriate time-varying correction of the value of the concentration estimated by the fluid concentration measuring apparatus 103.

That correction can be affected in some cases as a modification of the sensitivity of the fluid concentration measuring apparatus 103.

Figure 2:
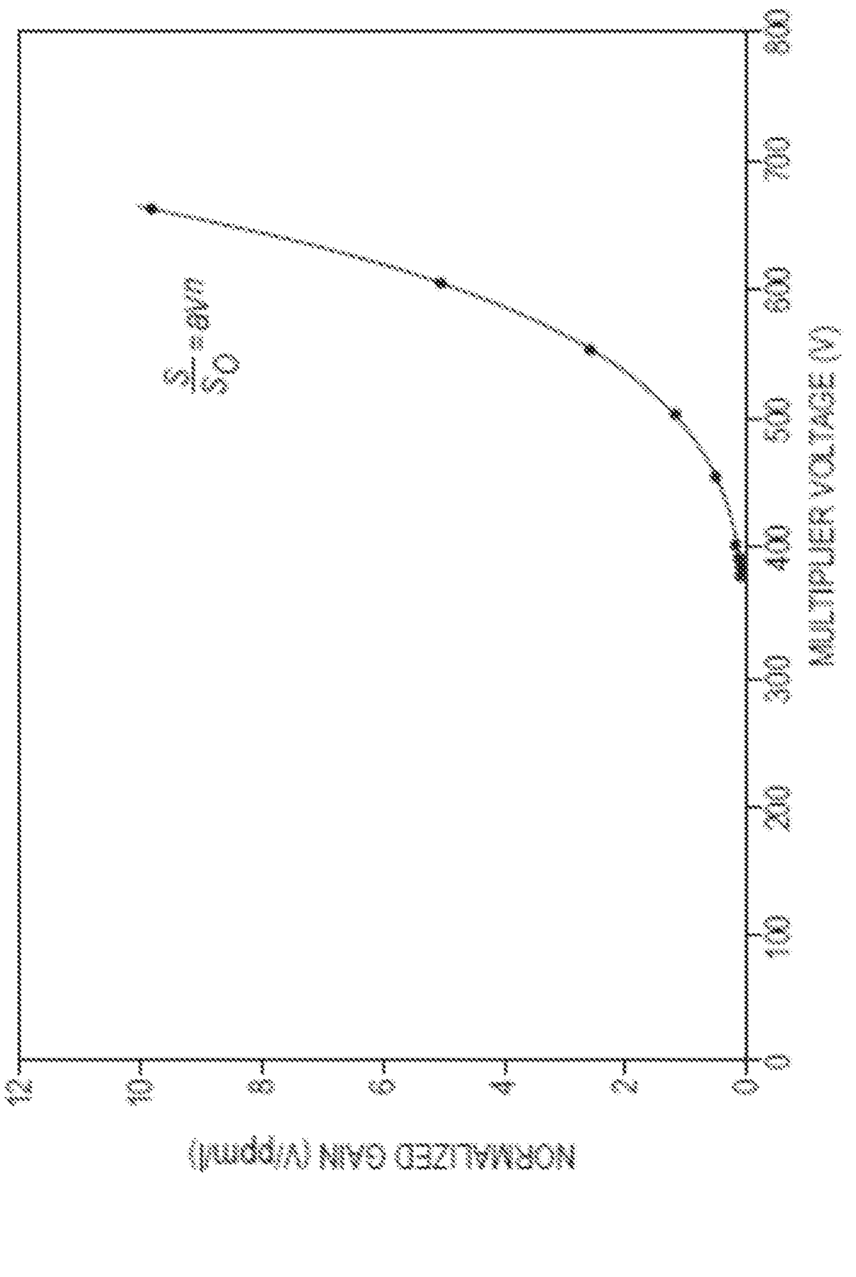
FIG. 2 depicts a graph of multiplier voltage vs. gain for a photomultiplier tube, which may form part of a fluid monitoring apparatus.
Figure 4B:
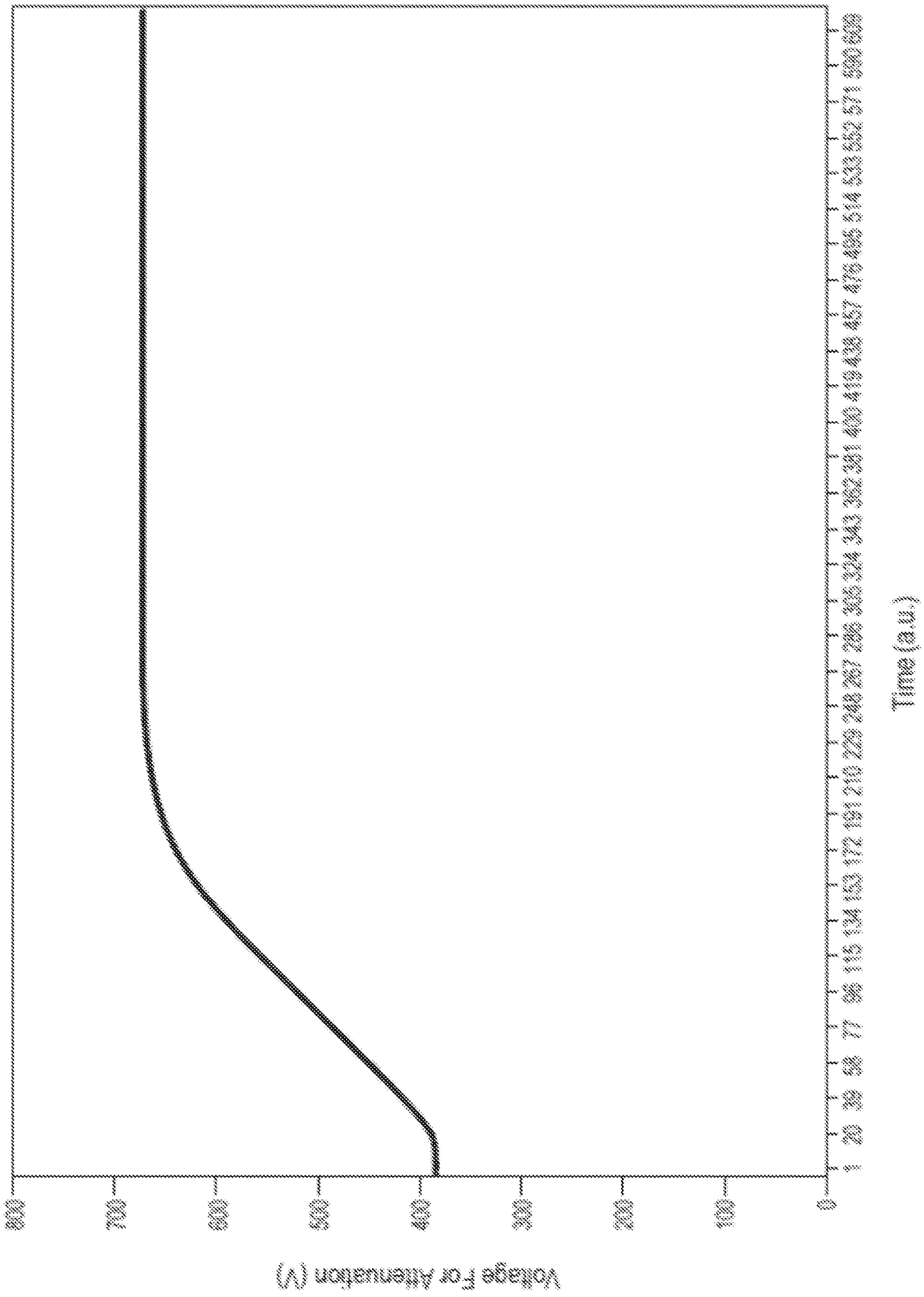

In particular, when the fluid concentration measuring apparatus 103 is a photomultiplier tube, it is possible to modify the gain by modifying the multiplier voltage (see FIG. 2). The time-varying correction may therefore be used to determine an appropriate time varying multiplier voltage supply. An example is shown in FIG. 4B. Here, the Y-axis represents the appropriate attenuation of the multiplier voltage, and the X-axis represents time.

Figure 5B:
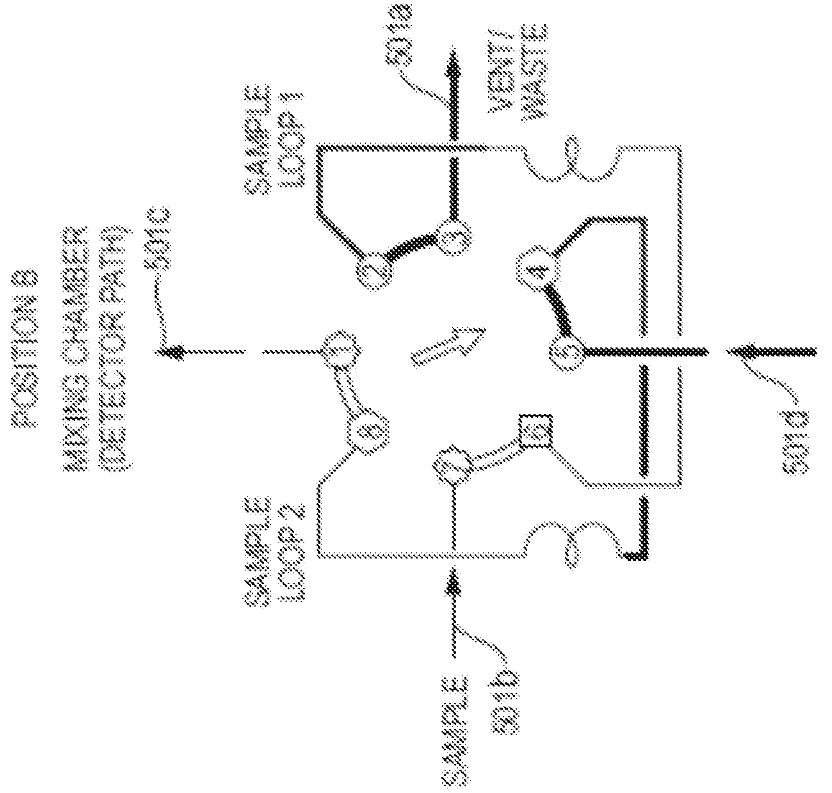
FIGS. 5A and 5B show a preferred injection valve in two configurations.
Figure 5A:
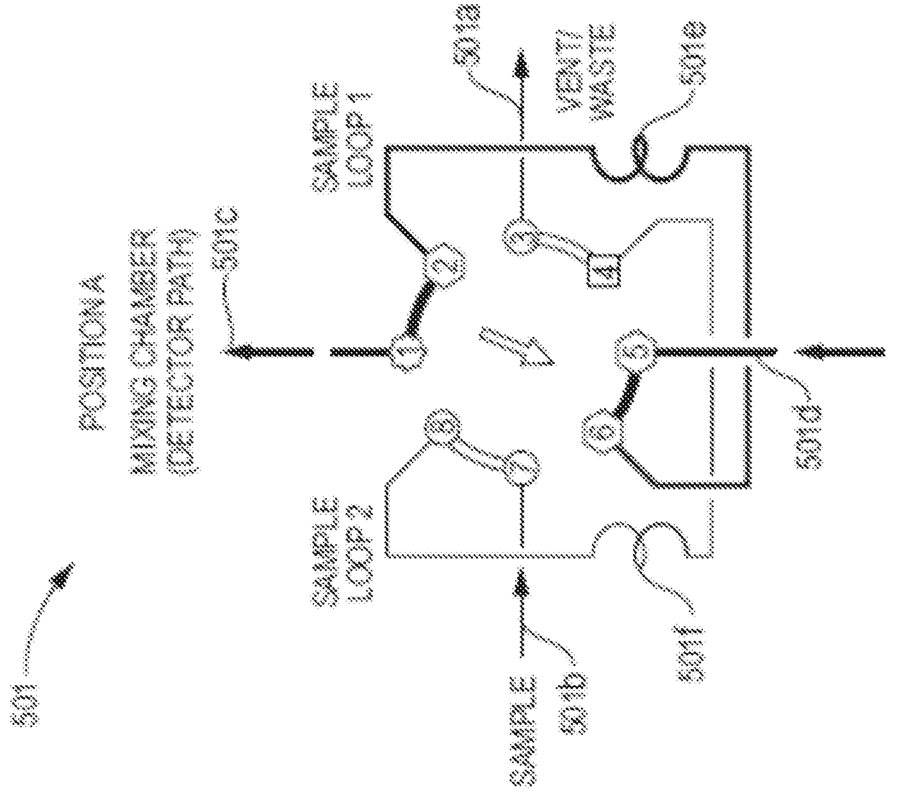

The embodiments described above are particularly advantageous in a system having the preferred type of injection valve shown in FIGS. 5A and 5B, which show the valve in its two configurations. This type of valve could be used as one or both of injections valves 101 and 104.

The preferred injection valve comprises two inlets 501*d*, 501*b*, and two outlets 501*c*, 501*a*. The injection valve 501 has two configurations. In the first configuration, sample enters via inlet 501*b* and exits at outlet 501*a* via sample loop 501*f*, filling its volume entirely. Simultaneously, carrier gas is entering via inlet 501*d* and transferring the contents of full injection loop 501*e* to mixing chamber 102 via outlet 501*c*. In the second configuration, sample enters via inlet 501*b* and exits at outlet 501*a* via the second of the two sample loops 501*e*, filling the volume whilst held in this position. Simultaneously, carrier gas entering via inlet 501*d* sweeps the contents of the first sample loop 501*f* out via outlet 101*c*. As one sample loop fills the other is transferring sample to mixing chamber 102 and vice versa. The valve 501 switches between the two configurations in accordance with a predefined duty cycle, as described above.

As can be understood from the above, the sensitivity of the fluid concentration measuring apparatus 103 may therefore be modified in order to automatically filter out the transient behavior of the system immediately following switching of the valving 100.

Moreover, the time-varying correction need not be used to modify the sensitivity of the fluid concentration measuring apparatus 103 itself but may simply be used to correct the concentration estimate that it provides. All that is required is that the system estimates the concentration of the first component in the sample fluid based at least in part on the flow change model 55.

In a system in which there are multiple supply paths, a sub-model may be defined for each path to, collectively, form the flow change model 55.

That is, the flow change model 55 may include: a first sub-model representing the variation in time of the flow of sample fluid along the first flow path; and a second sub-model representing the variation in time of the flow of sample fluid along the second flow path. The concentration of the first component in the sample fluid may be estimated using the controlled ratio and the first sub-model when supplied along the first path, while the concentration of the first component in the sample fluid may be estimated using the controlled ratio and the second sub-model when supplied along the second path.

The above shows the analysis for a step-change system, such as in a dual-range analyzer that includes valving 100, which switches between providing a sample of fluid to be measured at one of two controlled rates into a carrier fluid, which is then supplied to a fluid concentration measurement apparatus 103, the expected change in concentration following the switch between rates can be modelled and used to modify the estimated concentration value to provide a more accurate estimate. Similar analysis can be applied to any valving system 100, with two or more discrete levels, or even a system in which the valving 100 provides a continuously-varied mixed flow into a fluid concentration measurement apparatus 103.

In some systems, it may be most important to improve the accuracy when monitoring a rapidly increasing concentration. For example, a flare event in a refinery produces a very rapid increase in concentration of a first component in a sample fluid. The invention may be used to track such rapid increases. In which case, the flow change model 55 may represent the flow change following a step decrease in the rate of provision of sample fluid to the fluid concentration measurement apparatus 103.

In some cases, the same flow change model 55 may be applicable to a step decrease in the rate of provision of sample fluid to the fluid concentration measurement apparatus 103. In others, a different flow change model 55 may be provided. Each of these flow change models 55 could be considered a sub-model of a larger flow change model.

In some cases, it may be possible to supply the sample of fluid at more than two controlled rates. The same flow change model 55 may be applicable to any of the possible steps between the controlled rates. In others, a different sub-model (collectively forming part of the flow change model 55) may be provided for each possible step change between the plurality of rates.

Figure 6A:
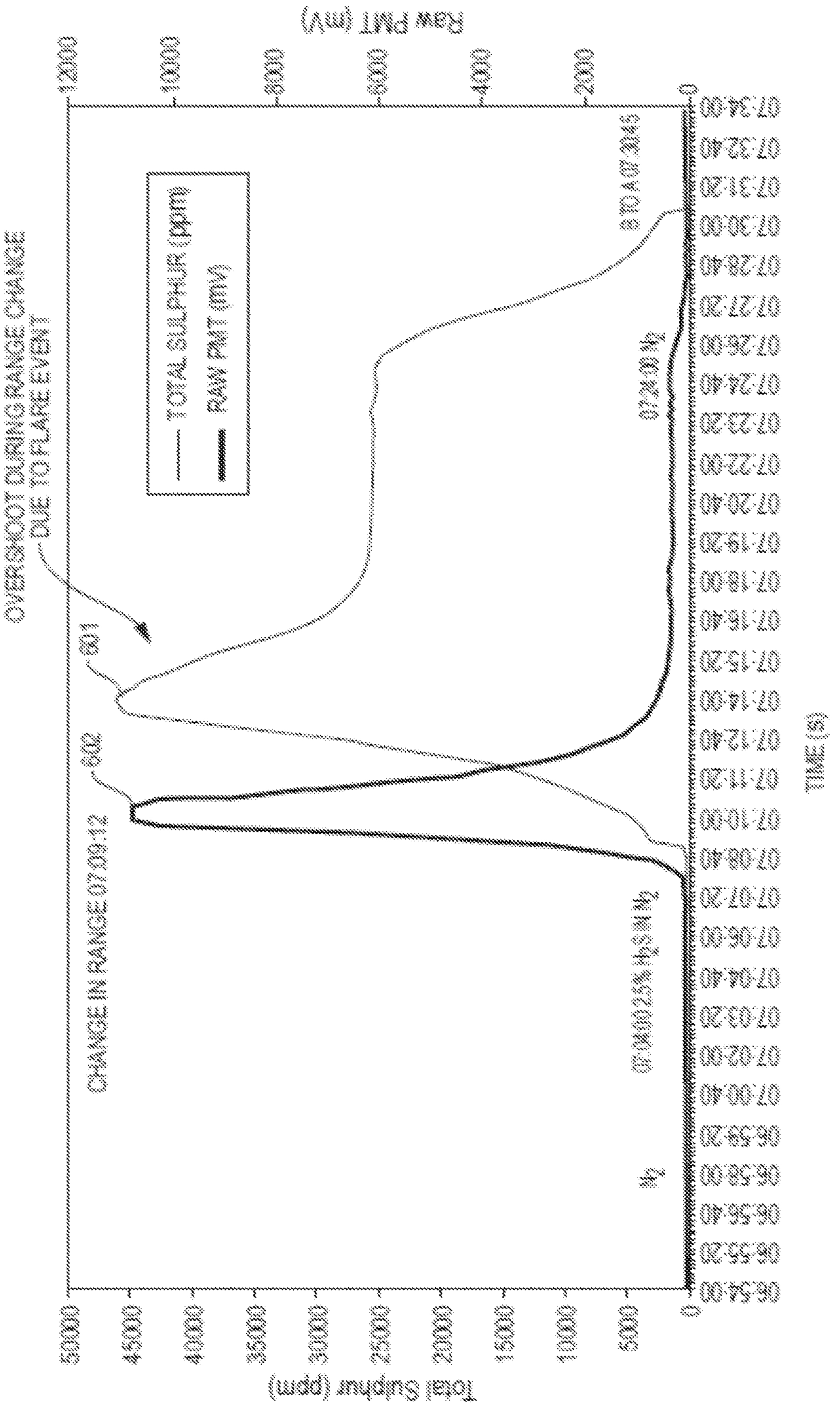
FIGS. 6A and 6B show comparative results of a dual-range analyzer with (FIG. 6A) and without (FIG. 6B) the invention.
Figure 6B:

FIGS. 6A and 6B illustrate the advantages of the invention in relation to a real-world system.

In FIG. 6A, without the invention, there is shown an overshoot in the estimated concentration 601 of Sulphur based on a measured voltage 602 obtained from a photomultiplier tube 103. As can be seen, the estimated concentration 601 peaks at a value of over 45,000 ppm and then plateaus at the correct value of around 26,000 ppm, showing a significant overshoot.

In FIG. 6B, with the attenuation of the sensitivity of the photomultiplier tube 103, there is shown just a small ripple in the estimated concentration 601 of Sulphur based on the measured voltage 602. As can be seen, the estimated concentration 601 peaks at a value of around 27,000 ppm and then plateaus at the correct value of around 26,000 ppm, showing a much more accurate measurement.

The following numbered paragraphs 1-28 provide various examples of the embodiments disclosed herein.

Paragraph 1. A system for analyzing the concentration of a first component in a sample fluid, comprising: a sample inlet for receiving a sample fluid to be analyzed comprising at least a first component; fluid concentration measuring apparatus for measuring the concentration of the first component within a fluid; a control inlet for receiving a control fluid; and valving in communication with the sample inlet and arranged to supply the sample fluid to the fluid concentration measuring apparatus at a controlled rate, wherein: the system provides a mixture of sample fluid and control fluid to the fluid concentration measuring apparatus in a controlled ratio; the system stores a flow change model, representing the variation in time of the flow of sample fluid through the system between the valving and the fluid concentration measuring apparatus in response to a variation of the controlled rate by the valving; and the system estimates the concentration of the first component in the sample fluid based at least in part on the controlled ratio, and the flow change model.

Paragraph 2. The system of paragraph 1, wherein: the fluid concentration measuring apparatus has a controllable sensitivity; and the system estimates the concentration of the first component in the sample fluid based at least in part on the controlled ratio, and the flow change model by controlling the sensitivity of the fluid concentration measuring apparatus in dependence upon the flow change model in response to variation of the controlled rate by the valving.

Paragraph 3. The system of paragraph 1 or paragraph 2, wherein: the fluid concentration measuring apparatus is an electrical device; and the controllable sensitivity is the gain of the fluid concentration measuring apparatus.

Paragraph 4. The system of any preceding paragraph, wherein the fluid concentration measuring apparatus is a photomultiplier tube.

Paragraph 5. The system of any preceding paragraph, wherein the flow change model separately represents the variation in time of the flow of sample fluid through the system between the valving and the fluid concentration measuring apparatus in response to change of the controlled rate by the valving for each of a plurality of rate changes.

Paragraph 6. The system of any preceding paragraph, wherein the flow change model separately represents: the variation in time of the flow of sample fluid through the system between the valving and the fluid concentration measuring apparatus in response to an increase of the controlled rate by the valving; and/or the variation in time of the flow of sample fluid through the system between the valving and the fluid concentration measuring apparatus in response to a decrease of the controlled rate by the valving.

Paragraph 7. The system of any preceding paragraph, wherein the flow change model represents the variation in time of the flow of sample fluid through the system between the valving and the fluid concentration measuring apparatus using a mathematical model.

Paragraph 8. The system of any preceding paragraph, wherein the mathematical model is an over-damped harmonic oscillator model.

Paragraph 9. The system of any preceding paragraph, wherein the valving is arranged to supply the sample fluid to the fluid concentration measuring apparatus at two or more fixed rates.

Paragraph 10. The system of any preceding paragraph, wherein the valving is arranged to control the rate of supply of the sample fluid based on the concentration measured by the fluid concentration measuring apparatus.

Paragraph 11. The system of any preceding paragraph, wherein the valving is arranged to reduce the rate of supply of the sample fluid based on the concentration measured by the fluid concentration measuring apparatus exceeding a threshold.

Paragraph 12. The system of any preceding paragraph, wherein the valving comprises first and second injection valves and a path switching valve, wherein: the first injection valve is arranged to switch between supplying sample fluid or control fluid at a first frequency along a first flow path to the fluid concentration measuring apparatus; the second injection valve is arranged to switch between supplying sample fluid or control fluid at a second frequency along a second path to the fluid concentration measuring apparatus; and the path switching valve supplies sample fluid to either the first injection valve or the second injection valve.

Paragraph 13. The system of paragraph 12, wherein the flow change model separately represents the variation in time of the flow of sample fluid along the first and second flow paths.

Paragraph 14. The system of any preceding paragraph, further comprising a mixing chamber between the valving and the fluid concentration measuring apparatus.

Paragraph 15. The system of paragraph 14, wherein the flow change model represents the variation in time of the flow of sample fluid through the system from the mixing chamber to the fluid concentration measuring apparatus.

Paragraph 16. A method for analyzing the concentration of a first component in a sample fluid, comprising: receiving a sample fluid to be analyzed comprising at least a first component; receiving a control fluid; mixing the sample fluid and the control fluid in a controlled ratio determined by valving to produce a mixed flow and thereby supplying the sample fluid to a fluid concentration measuring apparatus at a controlled rate; measuring the concentration of the first component within the mixture using the fluid concentration measuring apparatus; and estimating the concentration of the first component in the sample fluid using the controlled ratio and a flow change model, wherein the flow change model represents the variation in time of the flow of sample fluid through the system between the valving and the fluid concentration measuring apparatus in response to a variation of the controlled rate by the valving.

Paragraph 17. The method of paragraph 16, comprising changing the rate of supply of the sample fluid using the valving in response to detect that the concentration measured by the fluid concentration measuring apparatus passes a threshold.

Paragraph 18. The method of paragraph 17, comprising reducing the rate of supply of the sample fluid using the valving in response to detect that the concentration measured by the fluid concentration measuring apparatus exceeds the threshold.

Paragraph 19. The method of any one of paragraphs 16 to 18, wherein the valving is arranged to supply the sample fluid to the fluid concentration measuring apparatus at two or more fixed rates.

Paragraph 20. The method of any preceding paragraph, comprising controlling the sensitivity of the fluid concentration measuring apparatus using the flow change model.

Paragraph 21. The method of paragraph 20, wherein the fluid concentration measuring apparatus is a photomultiplier tube, comprising attenuating the gain of the photomultiplier tube using the flow change model.

Paragraph 22. The method of any one of paragraph 16 to 21, wherein the step of mixing the sample fluid and the control fluid comprises: delivering the control fluid into a mixing chamber; and delivering the sample fluid into the mixing chamber at the controlled rate.

Paragraph 23. The method of paragraph 22, wherein the flow change model represents the variation in time of the flow of sample fluid through the system from the mixing chamber to the fluid concentration measuring apparatus.

Paragraph 24. The method of any one of paragraphs 16 to 23, wherein the valving comprises first and second injection valves, wherein: the first injection valve is arranged to switch between supplying sample fluid or control fluid at a first frequency along a first flow path to the fluid concentration measuring apparatus; the second injection valve is arranged to switch between supplying sample fluid or control fluid at a second frequency along a second path to the fluid concentration measuring apparatus; and the method further comprises: supplying sample fluid along the first flow path; and switching to supplying sample fluid along the second flow path in response to detecting that the concentration measured by the fluid concentration measuring apparatus passes a threshold.

Paragraph 25. The method of any one of paragraphs 16 to 23, wherein the valving comprises first and second injection valves, wherein: the first injection valve is arranged to switch between supplying sample fluid or control fluid at a first frequency along a first flow path to the fluid concentration measuring apparatus; the second injection valve is arranged to switch between supplying sample fluid or control fluid at a second frequency along a second path to the fluid concentration measuring apparatus; the flow change model includes a first sub-model representing the variation in time of the flow of sample fluid along the first flow path; the flow change model includes a second sub-model representing the variation in time of the flow of sample fluid along the second flow path; and the method further comprises: supplying sample fluid along the first flow path and estimating the concentration of the first component in the sample fluid using the controlled ratio and the first sub-model; and switching to supplying sample fluid along the second flow path in response to detecting that the concentration measured by the fluid concentration measuring apparatus passes a threshold, and estimating the concentration of the first component in the sample fluid using the controlled ratio and the second sub-model.

Paragraph 26. A method for deriving a flow change model in a system for analyzing the concentration of a first component in a sample fluid, comprising: providing a sample fluid comprising at least a first component and having a fixed concentration of the first component; receiving a control fluid; mixing the sample fluid and the control fluid in a first ratio determined by valving to produce a first mixed flow; measuring the concentration of the first component in the first mixed fled flow using the fluid concentration measuring apparatus; estimating the concentration of the first component in the sample fluid using the first ratio, actuating the valving to mix the sample fluid and the control fluid in a second ratio, different from the first ratio, to produce a second mixed flow; measuring the concentration of the first component in the second mixed fled flow using the fluid concentration measuring apparatus; estimating the concentration of the first component in the sample fluid using the second ratio; capturing the time series of estimates of concentration; and deriving a flow change model from the time series.

Paragraph 27. The method of paragraph 26, wherein deriving a flow change model from the time series comprises fitting a mathematical model to the time series.

Paragraph 28. The method of paragraph 27, wherein deriving a flow change model from the time series comprises deriving an over-damped harmonic oscillator model from the time series.

Those having skill in the art, with the knowledge gained from the present disclosure, will recognize that various changes can be made to the disclosed apparatuses and methods in attaining these and other advantages, without departing from the scope of the present disclosure. As such, it should be understood that the features described herein are susceptible to modification, alteration, changes, or substitution. For example, it is expressly intended that all combinations of those elements and/or steps which perform substantially the same function, in substantially the same way, to achieve the same results are within the scope of the embodiments described herein. Substitutions of elements from one described embodiment to another are also fully intended and contemplated. The specific embodiments illustrated and described herein are for illustrative purposes only, and not limiting of that which is set forth in the appended claims. Other embodiments will be evident to those of skill in the art. It should be understood that the foregoing description is provided for clarity only and is merely exemplary. The spirit and scope of the present disclosure is not limited to the above implementation and examples but is encompassed by the following claims. All publications and patent applications cited above are incorporated by reference in their entirety for all purposes to the same extent as if each individual publication or patent application were specifically and individually indicated to be so incorporated by reference.

What is claimed is:

1. A system for analysing analyzing the concentration of a first component in a sample fluid, comprising:

a sample inlet for receiving a sample fluid comprising at least a first component;

a fluid concentration measuring apparatus arranged to measure a concentration of the first component and provide the concentration of the first component to a controller;

a control inlet for receiving a control fluid; and valving in communication with the sample inlet and the control inlet, the valving arranged to supply a mixture comprising a controlled ratio of the sample fluid and the control fluid to the fluid concentration measuring apparatus at a constant rate, wherein a first state comprises the mixture comprising the controlled ratio with a supply of the sample fluid at a first flow rate and a second state comprises the mixture comprising the controlled ratio with a supply of the sample fluid at a second flow rate that is greater than the first flow rate;

wherein:

the controller controls the valving to switch between the first state and the second state when the concentration of the first component crosses a threshold value, and estimates the concentration of the first component in a residual volume comprising the mixture in a flow path between the valving and the fluid concentration measuring apparatus using a flow change model that uses the controlled ratio of the first state or the second state present prior to the switch over a period from a first point in time initiated by the switch to a second point in time when the residual volume has flowed past the fluid concentration measuring apparatus.

2. The system of claim 1, wherein:

the fluid concentration measuring apparatus has a controllable sensitivity; and the system controls the sensitivity of the fluid concentration measuring apparatus using the estimate of the concentration of the first component in the residual volume.

3. The system of claim 2, wherein:

the fluid concentration measuring apparatus is an electrical device; and the controllable sensitivity is the gain of the fluid concentration measuring apparatus.

4. The system of claim 1, wherein the fluid concentration measuring apparatus is comprises a photomultiplier tube.

5. The system of claim 1, wherein the flow change model comprises a mathematical model.

6. The system of claim 5, wherein the mathematical model is an over-damped harmonic oscillator model.

7. The system of claim 1, wherein the valving is arranged to supply the sample fluid to the fluid concentration measuring apparatus at two or more fixed rates.

8. The system of claim 1, wherein the valving is arranged to control the rate of supply of the sample fluid based on the concentration of the first component measured by the fluid concentration measuring apparatus.

9. The system of claim 1, wherein the valving is arranged to reduce the rate of supply of the sample fluid based on the concentration measured by the fluid concentration measuring apparatus exceeding the threshold.

10. The system of claim 1, wherein the valving comprises a first injection valve, a second injection valve, and a path switching valve, wherein:

the first injection valve is arranged to inject the sample fluid into a stream of the control fluid along a first flow path to the fluid concentration measuring apparatus;

the second injection valve is arranged to inject the sample fluid into a stream of the control fluid along a second path to the fluid concentration measuring apparatus; and the path switching valve supplies the sample fluid to either the first injection valve or the second injection valve.

11. The system of claim 10, wherein the flow change model separately uses the flow of the residual volume along the first or the second flow paths.

12. The system of claim 1, further comprising a mixing chamber between the valving and the fluid concentration measuring apparatus.

13. The system of claim 12, wherein the flow change model uses the flow of the residual volume through the system from the mixing chamber to the fluid concentration measuring apparatus.

14. The system of claim 1, wherein the threshold value comprises a concentration value within a region of an operating range of the fluid concentration measuring apparatus.

15. A method for analyzing the concentration of a first component in a sample fluid, comprising:

receiving a sample fluid comprising at least a first component;

measuring a concentration of the first component using a fluid concentration measuring apparatus;

providing the concentration of the first component to a controller;

receiving a control fluid;

supplying a mixture comprising a controlled ratio of the sample fluid and the control fluid to a fluid concentration measuring apparatus at a constant rate using valving, wherein a first state comprises the mixture comprising the controlled ratio with a supply of the sample fluid at a first flow rate and a second state comprises the mixture comprising the controlled ratio with a supply of the sample fluid at a second flow rate that is greater than the first flow rate;

switching between the first state and the second state when the concentration of the first component crosses a threshold value, estimating the concentration of the first component in a residual volume comprising the mixture in a flow path between the valving and the fluid concentration measuring apparatus using a flow change model that uses the controlled ratio of the first state or the second state present prior to the switch over a period from a first point in time initiated by the switch to a second point in time when the residual volume has flowed past the fluid concentration measuring apparatus.

16. The method of claim 15, comprising reducing the rate of supply of the sample fluid using the valving in response to detecting that the concentration of the first component measured by the fluid concentration measuring apparatus exceeds the threshold.

17. The method of claim 15, wherein the valving is arranged to supply the sample fluid to the fluid concentration measuring apparatus at two or more fixed rates.

18. The method of claim 15, comprising controlling the sensitivity of the fluid concentration measuring apparatus using the estimate of the concentration of the first component in the residual volume.

19. The method of claim 18, wherein the fluid concentration measuring apparatus comprises a photomultiplier tube, and controlling the sensitivity comprises attenuating a gain of the photomultiplier tube using the estimate of the concentration of the first component in the residual volume.

20. The method of claim 15, wherein the step of supplying a mixture of the sample fluid and the control fluid comprises:

delivering the control fluid into a mixing chamber between the valving and the fluid concentration measuring apparatus; and delivering the sample fluid into the mixing chamber.

21. The method of claim 20, wherein the flow change model uses the flow of the residual volume through the system from the mixing chamber to the fluid concentration measuring apparatus.

22. The method of claim 15, wherein the valving comprises a first injection valve and a second injection valve, wherein:

the first injection valve is arranged to inject the sample fluid into a stream of the control fluid along a first flow path to the fluid concentration measuring apparatus;

the second injection valve is arranged to inject the sample fluid into a stream of the control fluid along a second path to the fluid concentration measuring apparatus; and the method further comprises:

supplying sample fluid along the first flow path; and switching to supplying sample fluid along the second flow path in response to detecting that the concentration of the first component measured by the fluid concentration measuring apparatus passes the threshold.

23. The method of claim 15, wherein the valving comprises a first injection valve and a second injection valve, wherein:

the first injection valve is arranged to inject the sample fluid into a stream of the control fluid along a first flow path to the fluid concentration measuring apparatus;

the second injection valve is arranged to inject the sample fluid into a stream of the control fluid along a second path to the fluid concentration measuring apparatus;

the flow change model includes a first sub-model that uses the flow of sample fluid along the first flow path;

the flow change model includes a second sub-model that uses the flow of sample fluid along the second flow path; and the method further comprises:

supplying the mixture in the first state comprising the controlled ratio of the sample fluid and the control fluid along the first flow path and estimating the concentration of the first component in the residual volume using the controlled ratio and the first sub-model; and switching to supplying the mixture in the second state comprising the controlled ratio of the sample fluid and the control fluid along the second flow path in response to detecting that the concentration of the first component measured by the fluid concentration measuring apparatus passes the threshold, and estimating the concentration of the first component in the residual volume using the controlled ratio and the second sub-model.

24. The method of claim 15, wherein the threshold value comprises a concentration value within a region of an operating range of the fluid concentration measuring apparatus.

* * * * *